United States Patent
Palfinger

(10) Patent No.: US 11,598,052 B2
(45) Date of Patent: Mar. 7, 2023

(54) MONORAIL SYSTEM

(71) Applicant: ABC IP Holding GmbH, Niklasdorf (AT)

(72) Inventor: Hubert Palfinger, Salzburg (AT)

(73) Assignee: ABC IP HOLDING GMBH, Niklasdorf (AT)

( * ) Notice: Subject to any disclaimer, the term of this patent is extended or adjusted under 35 U.S.C. 154(b) by 540 days.

(21) Appl. No.: 16/613,535

(22) PCT Filed: May 16, 2017

(86) PCT No.: PCT/AT2017/060130
§ 371 (c)(1),
(2) Date: Nov. 14, 2019

(87) PCT Pub. No.: WO2018/209367
PCT Pub. Date: Nov. 22, 2018

(65) Prior Publication Data
US 2020/0071885 A1 Mar. 5, 2020

(51) Int. Cl.
| | |
|---|---|
| *E01B 23/02* | (2006.01) |
| *B63B 59/06* | (2006.01) |
| *B63C 5/02* | (2006.01) |
| *E01B 25/08* | (2006.01) |
| *F16M 11/42* | (2006.01) |
| *B61B 13/04* | (2006.01) |
| *E01B 25/10* | (2006.01) |

(Continued)

(52) U.S. Cl.
CPC .............. *E01B 23/02* (2013.01); *B61B 13/04* (2013.01); *B63B 59/06* (2013.01); *B63C 5/02* (2013.01); *E01B 23/04* (2013.01); *E01B 23/06* (2013.01); *E01B 25/08* (2013.01); *E01B 25/10* (2013.01); *E01B 25/12* (2013.01); *F16M 11/425* (2013.01); *B63B 81/00* (2020.01); *B63C 2005/025* (2013.01)

(58) Field of Classification Search
CPC .......... E01B 11/28; E01B 11/32; E01B 11/42; E01B 23/02; E01B 23/06; E01B 25/08; E01B 25/10; E01B 25/12; B61B 13/04; B63B 59/06; B63B 81/00; B63B 2059/065; B08B 1/00; B08B 3/024; B63C 5/00; B63C 2005/025; F16M 11/425
USPC ................................................. 238/171, 230
See application file for complete search history.

(56) References Cited

U.S. PATENT DOCUMENTS

| | | | | | |
|---|---|---|---|---|---|
| 328,692 | A | * | 10/1885 | Larkin ..................... | E01B 11/42 238/237 |
| 1,054,613 | A | * | 2/1913 | Psilander ................. | E01B 23/06 246/468 |

(Continued)

FOREIGN PATENT DOCUMENTS

| | | | | | |
|---|---|---|---|---|---|
| GB | | 827969 A | * | 2/1960 | ............. E01B 25/12 |
| JP | 2002021321 A | | | 1/2002 | |

(Continued)

*Primary Examiner* — Zachary L Kuhfuss
(74) *Attorney, Agent, or Firm* — Dykema Gossett PLLC

(57) ABSTRACT

An aspect of the present disclosure is directed to a monorail system configured and arranged for displacing at least one maintenance device configured and arranged for machining substantially vertically extending surfaces. Another aspect is directed to a maintenance system consisting of at least one maintenance device which is displaceable on the monorail system.

18 Claims, 3 Drawing Sheets

(51) Int. Cl.
*E01B 25/12* (2006.01)
*E01B 23/06* (2006.01)
*E01B 23/04* (2006.01)
*B63B 81/00* (2020.01)

(56) References Cited

U.S. PATENT DOCUMENTS

| | | | | | |
|---|---|---|---|---|---|
| 1,107,017 | A | * | 8/1914 | Barnes | E01B 11/58 |
| | | | | | 238/210 |
| 1,385,269 | A | * | 7/1921 | Pereire | E01B 5/08 |
| | | | | | 238/7 |
| 2,067,695 | A | * | 1/1937 | Conley | E01B 11/32 |
| | | | | | 104/47 |
| 2,722,384 | A | * | 11/1955 | Buhrer | E01B 11/28 |
| | | | | | 238/218 |
| 4,171,774 | A | * | 10/1979 | Deslauriers | E01B 11/28 |
| | | | | | 238/230 |
| 5,219,395 | A | * | 6/1993 | Spieldiener | E01B 25/12 |
| | | | | | 104/130.11 |
| 10,472,030 | B2 | * | 11/2019 | Palfinger | B63B 59/06 |
| 2012/0111957 | A1 | * | 5/2012 | Zhou | B60M 1/305 |
| | | | | | 238/14.6 |
| 2019/0185118 | A1 | * | 6/2019 | Palfinger | B63B 59/10 |

FOREIGN PATENT DOCUMENTS

| | | |
|---|---|---|
| WO | 2010057942 A1 | 5/2010 |
| WO | 2012080448 A1 | 6/2012 |

* cited by examiner

MONORAIL SYSTEM

CROSS-REFERENCE TO RELATED APPLICATIONS

This application is a national stage filing based upon International PCT Application No. PCT/AT2017/060130, filed 16 May 2017.

BACKGROUND

The invention relates to a monorail system which can be assembled in a modular manner and has a plurality of rail segments, its use for displacing maintenance devices for machining essentially vertically extending surfaces, in particular ship hulls, and a maintenance system consisting of at least one maintenance device and the monorail system according to the invention.

In many areas of technology, it is necessary to examine and treat the surface of large construction areas, especially those made of steel. For example, the hull of ships must be protected against corrosion at certain intervals. For this purpose, old defective coatings are removed in a special process, so that the cleaned steel surfaces of the ship's hull can then be provided with a new coating. This process is referred to as "recoating".

In ship docks, maintenance devices are usually used to clean, paint and/or recoat ship hulls and/or ship superstructures. These maintenance devices are designed either as rigidly mounted large-area superstructures or as smaller mobile units which are moved along the surface to be machined, e.g. ship hull. Such a maintenance device can, for example, be found in EP 2 370 312 B1 of the applicant. These devices are usually either mounted on a motor vehicle, such as a truck, or on a rail system.

Rail systems are usually rigidly mounted on the dock, i.e. in a positive fit, or arranged within a track bed, so that the maintenance device has to compensate for differences in the distance between the rail system and the area to be machined. However, since the size and/or shape of the vessels vary and there is also an increasing distance between the maintenance device and the hull, particularly in the bow and stern areas of the vessel, the maintenance device on such rail systems must compensate for this distance in accordance with the prior art. Such rail systems are therefore extremely inflexible.

SUMMARY OF THE INVENTION

It is therefore the object of the invention to eliminate the disadvantages of the prior art and to provide a rail system of the kind mentioned above which can be easily assembled and adapted to different types of ships.

This object is solved according to the invention by a monorail system of the initially mentioned type in that at least two curved rail segments are provided which have a rail end piece formed in a convex manner and a rail end piece formed in a concave manner, wherein in the assembled state at least one convexly formed rail end piece of a first curved rail segment is in articulated connection with a concavely formed rail end piece of an adjacent second curved rail segment. Such a modularly formed rail system with only one rail track, on which at least one maintenance device can be displaced, can be set up particularly quickly and flexibly and adapted to the respective shape of the ship, because the individual curved rail segments can be pivoted to each other via the articulated connection and thus a suitable curved course of the rail track can be set.

In a preferred embodiment of the invention, the at least one convexly formed rail end piece of the first curved rail segment engages in the concavely formed rail end piece of the adjacent second curved rail segment, wherein a fitting bolt connects the two curved rail segments to one another so as to be pivotable relative to one another. The assembly of the essentially perfectly fitting rail end pieces of the individual curved rail segments as well as the use of a fitting bolt to connect them allows a particularly rapid assembly of the monorail system according to the invention.

In order to adjust the curvature or the curve area of a section of the monorail system according to the invention, it is provided that two set screws are preferably provided on each curved rail segment, which cooperate with a stop arranged on the adjacent curved rail segments. In order to simplify the assembly of the monorail system, the individual curved rail segments are first joined together and then, arranged on the base, pivoted to each other via the articulated connection in order to achieve the desired curve shape of the track section.

A major advantage of this monorail system is that, due to its modular design, it can be flexibly adapted to practically any route. Furthermore, no force-fit fixing of the individual rail segments to the base is provided. The positioning of the rail segments is carried out exclusively by non-positive/frictional engagement, which is achieved by moving devices arranged on the monorail system, in particular maintenance devices. It is therefore provided in a further preferred embodiment of the invention that additional ballast elements, preferably concrete slabs, can be arranged on at least one, preferably two adjacent rail segments in order to further improve this frictional engagement. Such ballast elements are particularly advantageous at the end areas of the monorail system, which is usually not designed as a self-contained rail track, in order to prevent the rail segments located in the end area from lifting and/or moving during operation.

In one variant of the present invention, at least one switch element is additionally provided, which allows maneuvering of the maintenance device(s) located on the monorail system.

Advantageously, the at least one switch element has two switch tongues which can be pivoted essentially parallel to each other and thus permit rapid diversion of devices located on the monorail system.

The monorail system according to the invention is predominantly installed outdoors, for example on ship docks. It is therefore exposed to environmental conditions such as temperature fluctuations and solar radiation. As a result, the rail segments expand and shrink again, which can lead to considerable changes in length when steel rail segments are used. These changes in length can in turn lead to distortions in the route of the monorail system. Therefore, it is preferable to provide at least one additional length compensation element to compensate for these temperature-induced length changes.

In particular, the at least one length compensation element preferably has two running surface elements which are separated from one another by a gap preferably extending obliquely to the longitudinal axis of the length compensation element and which are arranged movably relative to one another on a base element. The changes in length can be absorbed by this changing gap.

The monorail system according to the invention has proved to be particularly suitable for moving maintenance devices for machining essentially vertical surfaces, in particular the hulls of ships. It allows, as already described, an individual and adaptable routing of the monorail system in order to bring at least one maintenance device movable on it into an optimal position to the surface to be machined, for example a ship's hull. The exclusive fixing of the monorail system to the base by means of non-positive/frictional engagement enables particularly quick and flexible assembly and disassembly of the monorail system.

The object is also advantageously solved by a maintenance system consisting of at least one maintenance device and the monorail system according to the invention, wherein the maintenance system is characterized in particular by quick assembly, adaptable routing and simple and reliable operation.

BRIEF DESCRIPTION OF THE DRAWINGS

In the following, the invention will be explained in more detail using non-restrictive embodiment examples with associated figures, wherein.

DETAILED DESCRIPTION

The monorail system 100 according to the invention is used in a preferred embodiment of the invention to move maintenance devices 200, wherein these maintenance devices 200 are intended, for example, for the machining of ship hulls 1000.

Figure 1:
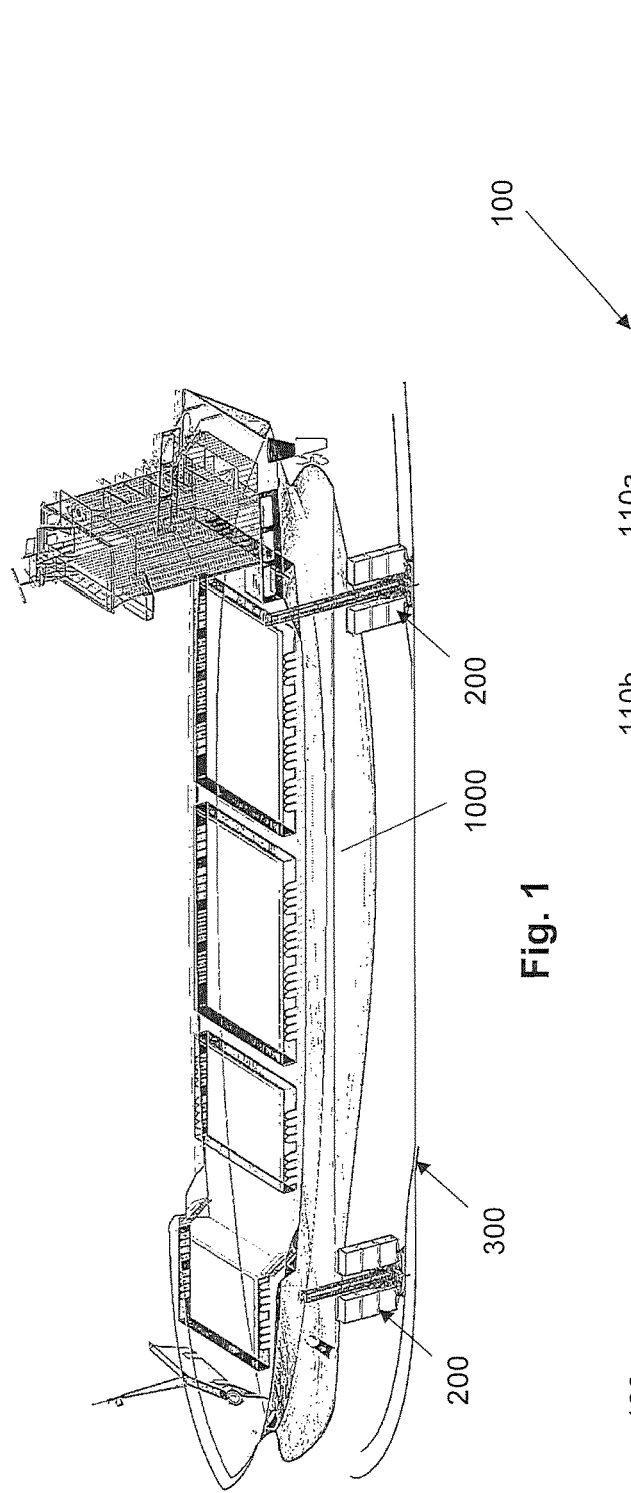
FIG. 1 shows a schematic view of the monorail system according to the invention with maintenance devices which are displaceable thereon.

As shown in FIG. 1, the monorail system 100 extends along the ship hull 1000 and is, for example, additionally provided with switches 300 in order to be able to maneuver the corresponding maintenance devices 200 as required. The monorail system 100 according to the invention is simply laid on the base without additional fixing, in this case on the ship dock.

Figure 2:
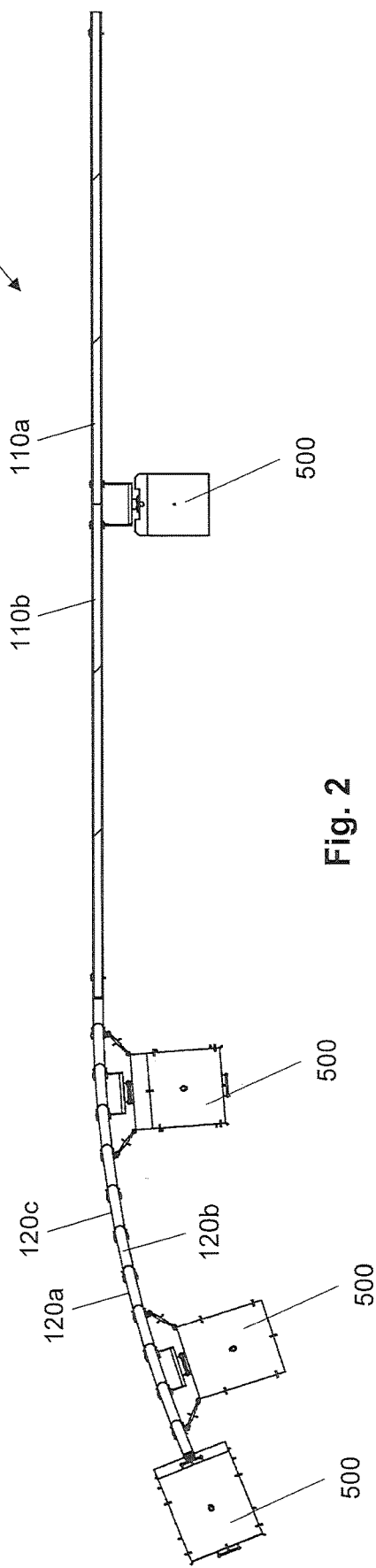
FIG. 2 shows a section of the monorail system from FIG. 1.

It can be seen from FIG. 2 that the monorail system 100 according to the invention is composed of a large number of rail segments 110a, 110b, 120a, 120b, 120c. The monorail system 100 is held in position on the base solely by frictional engagement, with the weight of the maintenance devices 200, which can be moved on the monorail system 100, in particular pressing it against the often uneven base.

In addition, this frictional engagement is supported by ballast elements 500, preferably in the form of concrete slabs, which are detachably attached to one, preferably two adjacent rail segments 110a, 110b, 120a, 120b. These ballast elements 500 can also be equipped with anti-slip mats arranged on their contact surface.

Figure 3:
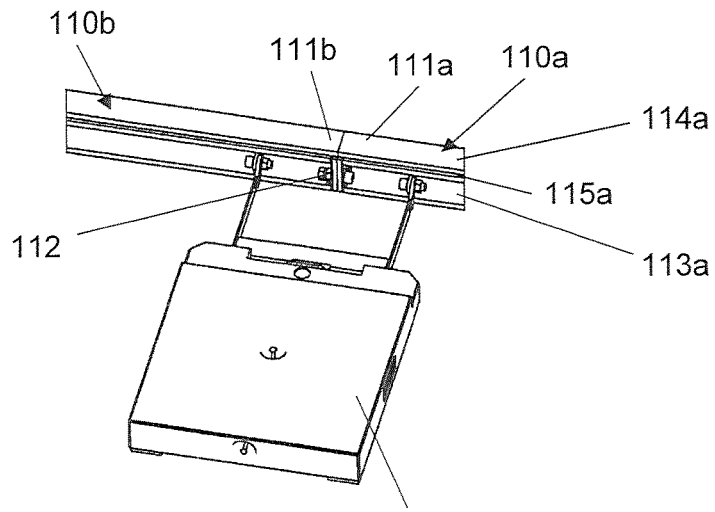
FIG. 3 shows a first detailed view of the monorail system from FIG. 1 on the straight rail segments.

Long rail segments 110a, 110b are provided for the laying of essentially straight sections, which are laid flush with each other with their straight ends 111a, 111b and screwed together by means of fixing screws 112 (FIG. 3). These elongated rail segments 110a, 110b have an essentially I-shaped cross-section with a bottom flange 113a resting on the base, an upper flange 114a preferably provided with a wear layer and a web 115a running normally to the bottom flange 113a and upper flange 114a.

Curved rail segments 120a, 120b, 120c are provided according to the invention for the laying of curved track sections. These curved rail segments 120a, 120b, 120c each have a convexly formed rail end piece 121a, 121b, 121c which engages in a concavely formed rail end piece 122b, 122c of a neighboring curve segment 120a, 120b.

Figure 4A:
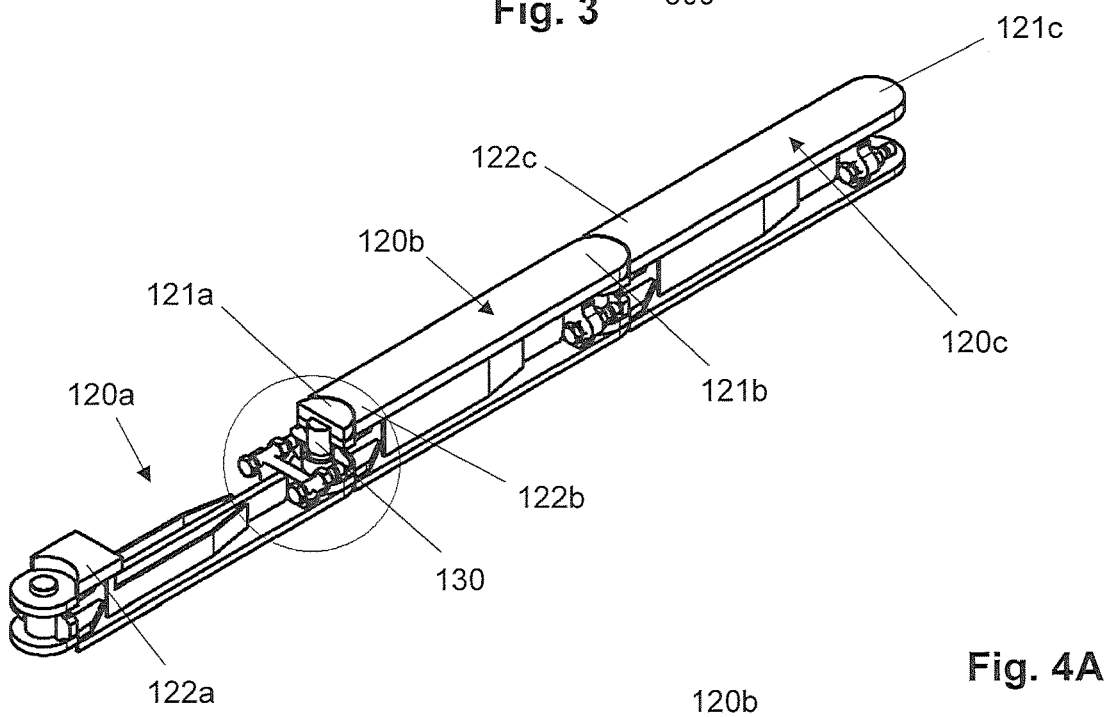
FIG. 4A shows a second detailed view of the monorail system from FIG. 1 on the curved rail segments.
Figure 4B:
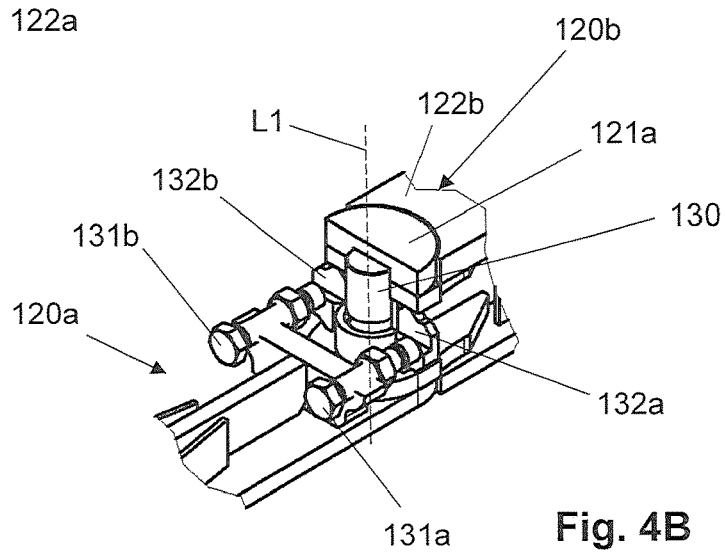
FIG. 4B shows a detailed view of the curved rail segments from FIG. 4A.

According to FIG. 4A and FIG. 4B, in which the upper flange of the first curved rail segment 120a was only partially shown to illustrate the articulated connection between adjacent curved rail segments, a fitting bolt 130 is provided, which connects the rail end pieces 121a, 122b to each other so that they can be pivoted in relation to each other. To adjust and fix the curvature of the track section, the curved rail segments 120a, 120b, 120c, which are connected to each other in an articulated manner, are rotated relative to each other via the longitudinal axis L1 of the fitting bolt 130 and fixed in their position relative to each other by means of set screws 131a, 131b. The set screws 131a, 131b of the first curved rail segment 120a each work together with a stop 132a, 132b on the adjacent second curved rail segment 120b for this purpose.

If both set screws 131a, 132b touch the respective stop 132a, 132b, the two adjacent curved rail segments 120a, 120b are aligned straight to each other as shown in FIG. 4B, their respective longitudinal axes thus lie on a common straight line. If the two adjacent curved rail segments 120a, 120b are arranged in a pivoted manner relative to each other, their respective longitudinal axes intersect at a predeterminable angle, with a first set screw 131a touching its stop 132a, while a second set screw 131b is spaced from its stop 132b.

Figure 5A:
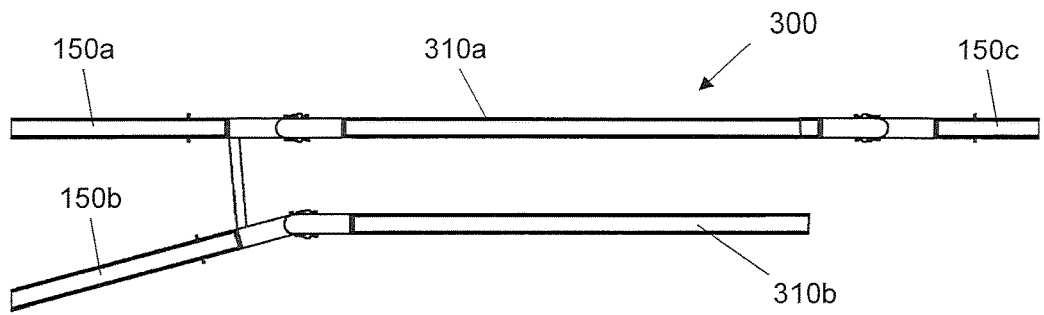
FIG. 5A shows a top view of a switch element in a first position.
Figure 5B:
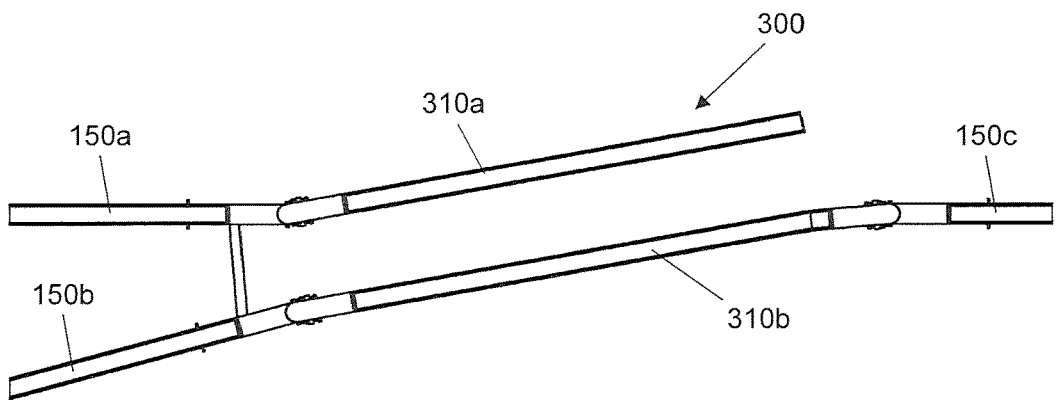
FIG. 5B shows a plan view of the switch element from FIG. 5A in a second position.

Furthermore, the monorail system 100 according to the invention has switch elements 300, as shown in FIGS. 5A and 5B. The switch element 300 according to the invention has two pivotable switch tongues 310a, 310b, each of which is in articulated connection with one rail section 150a, 150b. By essentially parallel pivoting of the two switch tongues 310a, 310b, either the first rail section 150a is connected to a third rail section 150c (FIG. 5A) or the second rail section 150b is connected to the third rail section 150c (FIG. 5B) and can accordingly be driven on by the maintenance device 200 (FIG. 1).

The monorail system 100 according to the invention is usually installed outdoors, for example on ship docks, and is thus exposed to outside temperatures and at least partially to solar radiation. These often high temperatures cause a linear expansion of the monorail system 100, which may lead to a bulging and/or displacement of the monorail system 100. However, this poses a significant risk to the operation of the maintenance devices 200.

Figure 6A:
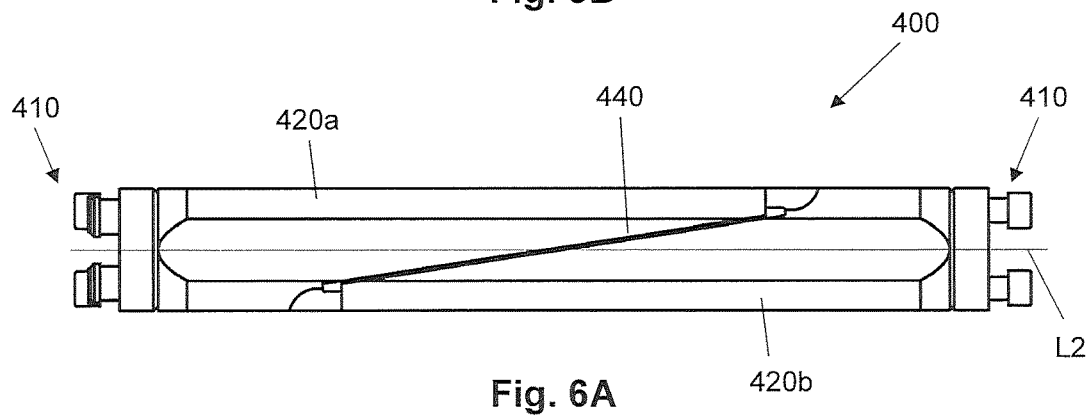
FIG. 6A shows a plan view of a length compensation element.
Figure 6B:
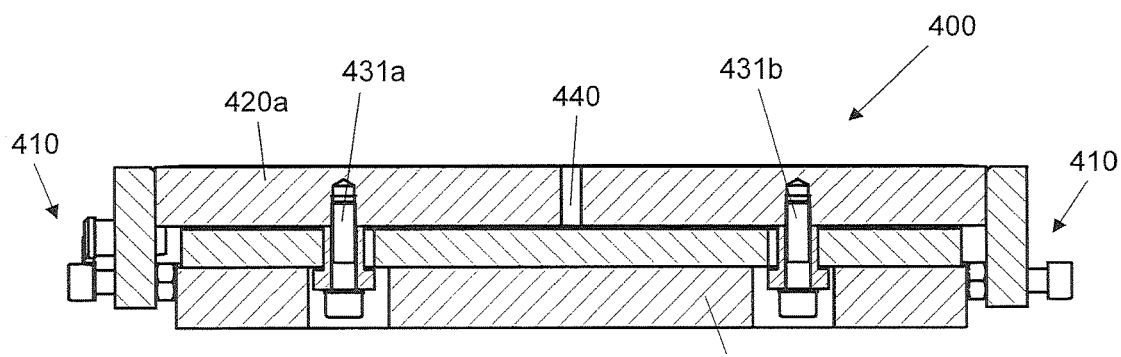
FIG. 6B shows a sectional view of the length compensation element from FIG. 6A.

Therefore, in this embodiment of the invention, additional length compensation elements 400 are provided (FIGS. 6A and 6B), which are preferably arranged at regular intervals, usually in the linear sections, between the rail segments 110a, 110b.

The length compensation element 400 is rigidly connected to the adjacent rail segments 110a, 110b via rail connection elements 410. It consists of two running surface elements 420*a*, 420*b*, which are connected to a base element 430, which lies on the base when assembled, by a screw connection 431*a*, 431*b* each. These screw connections 431*a*, 431*b* are immovably screwed to the running surface elements 420*a*, 420*b*, but can be moved within the base element 430 parallel to the longitudinal axis L2 of the length compensation element 400. The two running surface elements 420*a* and 420*b* are arranged at a distance from each other via a gap 440. If, for example, the longitudinal extension of the rail segments of the monorail system changes as a result of solar radiation, the distance between the running surface elements 420*a*, 420*b* with respect to each other also changes and the gap 440 is thus reduced. Since the change in the length extension of the rail segments due to temperature fluctuations can be significant, it is provided in this embodiment of the length compensation element 400 according to the invention that the gap 440 extends obliquely to the longitudinal axis L2 of the length compensation element 400 in order to ensure trouble-free displacement of a running wheel of the maintenance device 200 located on the running surface elements 420*a*, 420*b*.

In order to lay the monorail system 100 according to the invention on a base such as a ship dock, it is preferably provided that in a first step the individual rail segments (110*a*, 110*b*, 120*a*, 120*b*, 120*c*) and, optionally, switch elements 300 and length compensation elements 400 are connected to each other. The curved rail segments 120*a*, 120*b*, 120*c* are first joined together in a straight line and then, by adjusting the corresponding set screws 131*a*, 131*b* in the manner described above, a curved course of this section of track is obtained, for example by means of ground markings on the base.

In a final step, ballast elements 500 may optionally be fitted at particularly vulnerable points on rail segments in order to improve the frictional connection of the 100 monorail system with the base in the relevant areas. This is particularly necessary at the ends 160 of the monorail system 100 in order to prevent these ends 160 from being lifted off when the monorail system 100 is travelled over by the maintenance devices 200 weighing several tons. In fact, the fixation of the monorail system 100 on the base is carried out almost exclusively by the frictional locking achieved by the weight of the maintenance devices 200.

A major advantage of the monorail system 100 according to the invention lies in its frictional or non-positive positioning on the base, without the need for additional positive-locking measures such as screw or bolt connections with the base or complex preparations of the base such as a track bed. This allows a quick assembly or disassembly of the monorail system 100 according to the invention on site, as well as a quick and easy installation of the monorail system to another location if required.

The invention claimed is:

1. A monorail system comprising:
   a plurality of rail segments including at least two curved rail segments, a convexly formed rail end piece of a first curved rail segment and a concavely formed rail end piece of a second curved rail segment, where the convexly formed rail end piece is in articulated connection with the concavely formed rail end piece;
   two set screws provided on each curved rail segment, and configured and arranged to adjust a curvature of a track section which is substantially composed of the at least two curved rail segments; and
   a stop arranged on an adjacent curved rail segment.

2. The monorail system according to claim 1, characterized in that the convexly formed rail end piece engages the concavely formed rail end piece via a fitting bolt, the fitting bolt configured and arranged to facilitate the convexly formed rail end piece and the concavely formed rail end piece to pivot relative to one another.

3. The monorail system of claim 1, characterized in that additional ballast elements are configured and arranged on at least one segment.

4. The monorail system according to claim 1, characterized in that additional ballast elements are configured and arranged on at least one rail segment.

5. The monorail system of claim 4, wherein the additional ballast elements are concrete slabs, and the concrete slabs are arranged on at least two adjacent rail segments.

6. The monorail system according to claim 1, further including at least one switch element.

7. The monorail system according to claim 6, wherein the at least one switch element includes two switch tongues configured and arranged to pivot substantially parallel to one another.

8. The monorail system of claim 7 further including:
   at least one length compensation element;
   a base element; and
   wherein the at least one length compensation element includes two running surface elements separated from one another by a gap configured and arranged movably relative to one another on the base element.

9. The monorail system according to claim 1, further including at least one length compensation element.

10. The monorail system according to claim 9, further including a base element; and
    wherein the at least one length compensation element includes two running surface elements separated from one another by a gap and configured and arranged movably relative to one another on the base element.

11. The monorail system of claim 10, wherein the gap extends obliquely to the longitudinal axis of the length compensation element.

12. The monorail system of claim 1, wherein the monorail system is configured and arranged for displacing at least one maintenance device configured and arranged for machining substantially vertically extending surfaces.

13. The monorail system of claim 12, wherein the monorail system is fixed to a base by means of frictional engagement.

14. The monorail system of claim 13, wherein the base is a ship dock.

15. The monorail system of claim 12, wherein the substantially vertically extending surface is a ship's hull.

16. Maintenance system comprising:
    at least one maintenance device; and
    a monorail system including
       a plurality of rail segments with at least two curved rail segments, a convexly formed rail end piece of a first curved rail segment and a concavely formed rail end piece of a second curved rail segment, wherein the convexly formed rail end piece is in articulated connection with the concavely formed rail end piece;
       two set screws provided on each curved rail segment, and configured and arranged to adjust a curvature of a track section which is substantially composed of the at least two curved rail segments; and
       a stop arranged on an adjacent curved rail segment;
    wherein the at least one maintenance device is displaceable on the monorail system.

17. The maintenance system according to claim 16, characterized in that the monorail system is fixed to a base by means of frictional engagement.

18. The maintenance system of claim 17, wherein the base is a ship dock.

\* \* \* \* \*